US009090757B2

(12) United States Patent
Mruk et al.

(10) Patent No.: US 9,090,757 B2
(45) Date of Patent: Jul. 28, 2015

(54) PREPARATION OF RUBBER REINFORCED WITH AT LEAST ONE OF GRAPHENE AND CARBON NANOTUBES WITH SPECIALIZED COUPLING AGENT AND TIRE WITH COMPONENT

(71) Applicant: The Goodyear Tire & Rubber Company, Akron, OH (US)

(72) Inventors: Ralf Mruk, Lipperscheid (LU); Annette Lechtenboehmer, Ettelbruck (LU); Klaus Unseld, Luxembourg (LU); Claude Ernest Felix Boes, Erpeldange (LU); Frederic Gerard Auguste Siffer, Petite Rosselle (FR); Ling Du, Fairlawn, OH (US); Robert Fokko Roskamp, Trier (DE); Leena Nebhani, Copley, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 13/941,583

(22) Filed: Jul. 15, 2013

(65) Prior Publication Data
US 2015/0018481 A1    Jan. 15, 2015

(51) Int. Cl.
| C08L 23/18 | (2006.01) |
| C08K 5/38 | (2006.01) |
| C08K 3/04 | (2006.01) |
| C08K 7/24 | (2006.01) |
| C08K 3/36 | (2006.01) |
| C08K 5/101 | (2006.01) |
| C08K 5/375 | (2006.01) |

(52) U.S. Cl.
CPC ... C08K 5/38 (2013.01); C08K 3/04 (2013.01); C08K 3/36 (2013.01); C08K 5/101 (2013.01); C08K 5/375 (2013.01); C08K 7/24 (2013.01)

(58) Field of Classification Search
CPC .......... C08F 36/06; C08F 36/08; C08L 9/06; C08K 5/548; C08K 5/38; C08K 5/375; C08K 3/04; C08K 3/36; B60C 1/00
USPC .......................................................... 524/571
See application file for complete search history.

(56) References Cited

U.S. PATENT DOCUMENTS

| 6,476,154 | B1 | 11/2002 | Maly et al. ................. 525/332.6 |
| 6,892,771 | B2 | 5/2005 | Stocchi ........................ 141/129 |
| 7,224,407 | B2 | 5/2007 | Yoshii et al. ................. 348/638 |
| 7,479,516 | B2 | 1/2009 | Chen et al. ................... 524/495 |
| 2006/0061011 | A1 | 3/2006 | Kikuchi et al. ............ 264/289.3 |
| 2006/0229404 | A1 | 10/2006 | Lechtenboehmer ......... 524/495 |
| 2010/0078194 | A1 | 4/2010 | Bhatt et al. .................... 174/110 |
| 2011/0146859 | A1 | 6/2011 | Schmitz et al. ............ 152/152.1 |
| 2014/0155544 | A1* | 6/2014 | Du et al. ..................... 524/575.5 |

FOREIGN PATENT DOCUMENTS

| DE | 102007056689 | 5/2009 | ............... B60C 1/00 |
| JP | 2009046547 | 3/2009 | ............... B60C 1/00 |
| KR | 20050027415 | 3/2005 | |
| KR | 100635604 | 10/2006 | |
| WO | 03/060002 | 7/2003 | ............... C08K 7/06 |

* cited by examiner

Primary Examiner — Kuo-Liang Peng
(74) Attorney, Agent, or Firm — Henry C. Young, Jr.

(57) ABSTRACT

The invention relates to preparation of rubber reinforced with at least one of graphene and carbon nanotubes with specialized coupling agent and tire with component thereof.

14 Claims, No Drawings

US 9,090,757 B2

PREPARATION OF RUBBER REINFORCED WITH AT LEAST ONE OF GRAPHENE AND CARBON NANOTUBES WITH SPECIALIZED COUPLING AGENT AND TIRE WITH COMPONENT

FIELD OF INVENTION

This invention relates to preparation of rubber reinforced with at least one of graphene and carbon nanotubes with specialized coupling agent and tire with component thereof.

BACKGROUND OF THE INVENTION

Rubber compositions containing diene-based elastomers often contain reinforcing fillers such as for example rubber reinforcing carbon black and precipitated silica together with a coupling agent for the precipitated silica. Rubber tires may contain at least one component comprised of such rubber composition.

Sometimes it may be desirable to provide a rubber composition containing an alternative reinforcing filler.

For example, such additional, or alternative, reinforcing filler may be in a form of graphene or carbon nanotubes.

Graphene and carbon nanotubes may exhibit exceptional mechanical and electrical properties that make them very interesting for the use in rubber compositions including for tire components. However, in order to benefit from the advantages of graphene or carbon nanotubes, it is important for a high level of their dispersion in their associated rubber be promoted. Such dispersion is generally a challenge because graphene sheets tend to stack together, exfoliated graphene platelets tend to agglomerate and carbon nanotubes tend to from entangled aggregates to thereby form restricted dispersions in the rubber composition and thereby weak interfacial interactions with diene-based elastomers in the rubber composition.

Therefore, it is recognized that more effective dispersions of graphene and carbon nanotubes in rubber compositions containing diene-based elastomer is desired.

For this invention, it is desired to promote interfacial bonding of graphene and carbon nanotubes to diene-based elastomers in a rubber composition.

For this endeavor, it is proposed to utilize coupling agents to promote coupling graphene and carbon nanotubes to diene-based elastomers with a coupling agent having a moiety to promote a pi-pi ($\pi$-$\pi$) network interaction with the graphene or carbon nanotubes and another moiety, such as for example a polysulfide, thiol (e.g. mercapto) moiety, or carbon-carbon double bonds, which is interactive with the diene-based elastomer(s) contained in a rubber composition.

However, the presence of a polysulfide or thiol (e.g. mercapto) moiety on a coupling agent is envisioned as rendering the coupling agent to be excessively and undesirably reactive with the diene-based elastomer(s) in the rubber composition during a preliminary rubber mixing stage under high shear and high temperature mixing of the rubber composition prior to addition of sulfur curatives.

Therefore, it is proposed to chemically block the polysulfide or thiol moiety of the coupling agents from prematurely interacting with diene-based elastomer(s) in the rubber composition.

For such purpose, it is proposed to chemically block the thiol moiety (e.g. mercapto moiety) of the coupling agent with a protective compound containing at least one of dithiobenzoate, trithiocarbonate, thioester, and polysulfide groups containing from about 2 to about 4 connecting sulfur atoms.

Representative of such compounds are, for example, 1-pyrene-methyl-trithiocarbonate, 1-phenanthrene methyl trithiocarbonate, and anthracene-9-methyl trithiocarbonate.

In order to promote coupling of the graphene or carbon nanotubes it will be necessary to unblock the blocked polysulfide or thiol moiety of the coupling agent during the rubber mixing process so that the coupling agent may interact with the diene-based elastomer(s) in the rubber composition.

It is therefore a significant aspect of this invention is to controllably promote unblocking of the coupling agent during mixing of the rubber composition which contains the graphene or carbon nanotubes.

Historically, graphene may be provided in a form of exfoliated graphite platelets, referred to herein as graphene, from exfoliated intercalated graphite (exfoliated intercalated graphite in a stacked platelet form with internal galleries between the graphite platelets) which may be exfoliated, for example, chemically or thermally. The graphene has been suggested, for example, for use in rubber compositions for various tire components. For example, and not intended to be limiting, see U.S. Pat. Nos. 7,479,516, 7,224,407 and 6,892,771 and U.S. Patent Publication No. 2006/0229404.

Such graphene (exfoliated graphite platelets) are typically irregularly shaped platelets and nano-sized in a sense that they have an average thickness in a range of from about 1 nm to about 5 nm (nanometers) and an average lateral dimension in a range of from about 0.1 to about 1 micrometer (e.g. in a range of from about 0.01 to about 1 square micrometers which is envisioned to have, for example, an average surface area per gram in a range of from about 20 to about 800 square meters per gram).

Historically, carbon nanotubes or graphene have heretofore been suggested for inclusion in rubber compositions, including tire treads, for various purposes. For example, and not intended to be limiting, see Patent Publications U.S. Pat. No. 6,476,154, US 2006/0061011, US 2010/0078194, US 2011/0146859, WO 2003/060002, DE 102007056689, JP 2009/046547, KR 100635604 and KR 2005027415.

Such carbon nanotubes are nano-sized particles in a sense of having, for example, an average diameter or thickness in a range of from about 1 nm to about 100 nm and an average L/D (length to diameter or thickness dimension, or ratio) in a range of from about 10/1 to about 10,000/1.

Such carbon nanotubes may be, for example, a product of gaseous carbon-containing compound such as for example, at least one of acetylene and ethanol, usually contained in nitrogen or hydrogen passed through or over a heated catalyst (e.g. heated to about 700° C.) of metal nanoparticles. Carbon deposited on the metallic nanoparticles in a form of the carbon nanotubes is recovered.

As indicated, a significant aspect of this invention is to provide the graphene or carbon nanotubes together with a coupling agent to controllably promote their interaction with diene-based elastomer in a rubber composition and thereby promote reinforcement of the rubber composition.

In the description of this invention, the term "phr" is used to designate parts by weight of a material per 100 parts by weight of elastomer. The terms "rubber" and "elastomer" may be used interchangeably unless otherwise indicated. The terms "vulcanized" and "cured" may be used interchangeably, as well as "unvulcanized" or "uncured", unless otherwise indicated.

SUMMARY AND PRACTICE OF THE INVENTION

In accordance with this invention, a method of preparing a rubber composition containing reinforcing filler comprised of at least one of graphene and carbon nanotubes is comprised of, based upon parts by weight per 100 parts by weight rubber (phr):

(A) Blending in at least one sequential preparatory mixing step at a temperature in a range of from about 70° C. to about 170° C., alternately from about 90° C. to about 170° C.,
 (1) 100 phr of at least one diene-based elastomer,
 (2) about 30 to about 120, alternately from about 50 to about 110, phr of rubber reinforcing filler comprised of about 0.5 to about 30, alternately from about 1 to about 10, phr of at least one of graphene and carbon nanotubes together with a specialized coupling agent, and
  (a) rubber reinforcing carbon black, or
  (b) combination of rubber reinforcing carbon black and precipitated silica (synthetic amorphous precipitated silica), together with silica coupler for the precipitated silica having a moiety reactive with hydroxyl groups (e.g. silanol groups) on the precipitated silica and another, different, moiety interactive with said diene-based elastomer(s), and
 wherein said specialized coupling agent has a moiety with pi electrons to create a pi-pi network with the graphene and carbon nanotubes and another polysulfide or thiol moiety to interact with said diene-based elastomer(s), (B) Blending in a subsequent final mixing step at a temperature in a range of from about 60° C. to about 120° C., alternately from about 70° C. to about 110° C., sulfur curatives comprised of sulfur and at least one sulfur cure accelerator.

In one embodiment, in said preparatory mixing step(s), said polysulfide or thiol moiety of said specialized coupler is chemically blocked from appreciably interacting with said diene-based elastomer(s) with a compound containing at least one of dithiobenzoate, trithiocarbonate, disulphide and tetrasulphide groups.

In one embodiment, in said preparatory mixing step(s) containing said chemically blocked specialized coupler, said method further comprises blending a primary amine with said rubber composition (to facilitate unblocking said blocked polysulfidic or thiol moiety of said specialized coupler and thereby promote its interaction with said diene-based elastomer(s)).

In one embodiment, in said preparatory mixing step(s), containing said primary amine blended with said chemically blocked specialized coupler, blending a strong organic acid with said rubber composition (to facilitate neutralizing said primary amine).

In further accordance with this invention, a rubber composition is provided as being prepared by such method.

In additional accordance with this invention a rubber composition is provided comprised of, based on parts by weight per parts by weigh of rubber (phr):

(A) 100 phr of at least one diene-based elastomer,
(B) about 30 to about 120, alternately from about 50 to about 110, phr of rubber reinforcing filler comprised of about 0.5 to about 30, alternately from about 1 to about 10, phr of at least one of graphene and carbon nanotubes together with a specialized coupling agent, and
 (1) rubber reinforcing carbon black, or
 (2) combination of rubber reinforcing carbon black and precipitated silica (synthetic amorphous precipitated silica), together with silica coupler for the precipitated silica having a moiety reactive with hydroxyl groups (e.g. silanol groups) on the precipitated silica and another, different, moiety interactive with said diene-based elastomer(s), and
wherein said specialized coupling agent has a moiety with pi electrons to create a pi-pi network with the graphene and carbon nanotubes and a polysulfide or thiol moiety to interact with said diene-based elastomer(s).

In further accordance with this invention, a tire is provided having at least one component comprised of such rubber composition.

In one embodiment, said primary amine is comprised of at least one of dodecylamine, aminopropyl triethoxysilane, and polyethylenimine.

In one embodiment, said organic acid is comprised of at least one of salicylic acid, benzoic acid, toluic acid, m-hydroxybenzoic acid, and p-hydroxybenzoic acid.

In one embodiment, said silica coupler is comprised of at least one of:

(A) bis(3-triethoxysilylpropyl) polysulfide having an average of from about 2 to about 4, alternately from about 2 to about 2.6 or from about 3.4 to about 3.8, connecting sulfur atoms in its polysulfidic bridge, and (B) alkoxyorganomercaptosilane.

In one embodiment, said graphene (exfoliated graphene platelets) have an average thickness in a range of from about 1 nm to about 5 nm (nanometers) and an average lateral dimension in a range of from about 0.1 to about 1 micrometer.

In one embodiment, said exfoliated graphene platelets have an average surface area per gram in a range of from about 20 to about 800 square meters per gram.

In one embodiment, said carbon nanotubes have an average diameter in a range of from about 5 to about 20 nanometers (nm) and an L/D ratio in a range of from about 100 to about 1000.

In one embodiment said specialized coupling agent is comprised of compounds represented by a Formula I selected from at least one of Formula I(a), Formula I(b) or Formula I(c) as:

Formula I

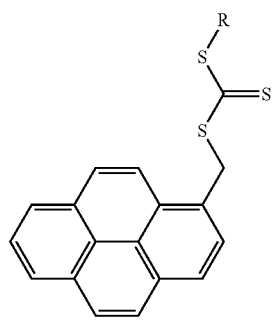

(a)

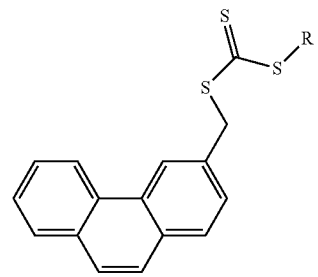

(b)

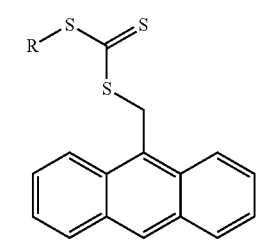

(c)

wherein R is selected from alkyl groups comprised of from about 3 to about 12 carbon atoms such as for example at least one of ethyl, methyl and propyl groups, a benzyl group and benzyl groups substituted with at least one of methyl, ethyl and propyl groups.

In such embodiment such compounds may be comprised of at least one of 1-pyrenemethyhl trithiocarbonate, 1-phenanthrene methyl trithiocarbonate and anthracene-9-methyhl-trithiocarbonate In one embodiment, such specialized coupling agent is comprised of compounds represented by a Formula II such as, for example, 1-pyrenemethyl methacrylate having a carbon-to-carbon double bond available to co-cure with diene-based elastomer(s) in the rubber composition to form a carbon-sulfur bond with the elastomer(s) during curing of the rubber composition at an elevated temperature.

The 1-pyrenemethyl methacrylate may be represented by Formula II as follows:

Formula II

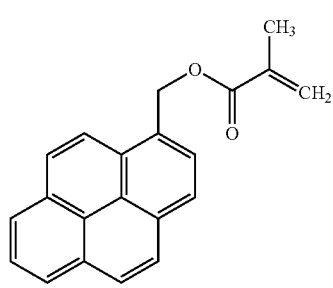

In one embodiment, such specialized coupling agent may be comprised of 1,3-di-(2-pyrenyl) propyl polysulphide or thiolpropyl pyrene with the polysulphide or thiol groups being available to co-cure with diene-based elastomer(s) in the rubber composition to form a carbon-sulfur bond with the elastomer(s) during the curing of the rubber composition at an elevated temperature.

In one embodiment, such specialized coupling agent may be represented by Formula III such as for example one of 1,3-di-(2-pyrenyl) alkyl polysulphide as Formula III(a), such as for example, 1,3-di-(2-pyrenyl)propyl polysulphide, and thiolalkyl pyrene as Formula III(b), such as for example thiolpropyl pyrene, where n is a value of from 1 through 3 and x is a value of from 2 through 4.

Formula III

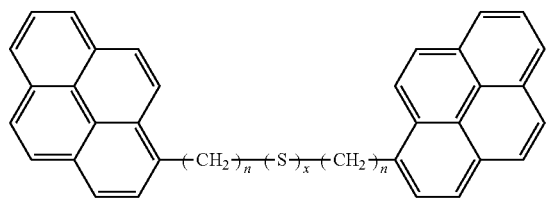

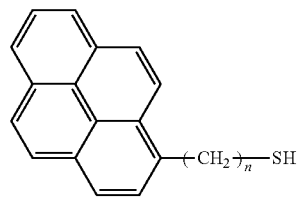

In practice, various diene-based elastomers may be used for the rubber composition such as, for example, polymers and copolymers comprised of at least one monomer comprised of at least one of isoprene and 1,3-butadiene and from styrene copolymerized with at least one of isoprene and 1,3-butadiene.

Representative of such conjugated diene-based elastomers are, for example, comprised of at least one of cis 1,4-polyisoprene (natural and synthetic), cis 1,4-polybutadiene, styrene/butadiene copolymers (aqueous emulsion polymerization prepared and organic solvent solution polymerization prepared), medium vinyl polybutadiene having a vinyl 1,2-content in a range of about 15 to about 90 percent, isoprene/butadiene copolymers, styrene/isoprene/butadiene terpolymers. Tin coupled elastomers may also be used, such as, for example, tin coupled organic solution polymerization prepared styrene/butadiene co-polymers, isoprene/butadiene copolymers, styrene/isoprene copolymers, polybutadiene and styrene/isoprene/butadiene terpolymers.

In one aspect, the conjugated diene-based elastomer may be an elastomer such as, for example, styrene/butadiene copolymer containing at least one functional group reactive with hydroxyl groups on a precipitated silica such as, for example, comprised of at least one of siloxy, amine and imine groups.

Commonly employed synthetic amorphous silica, or siliceous pigments, used in rubber compounding applications can be used as the silica in this invention, including precipitated siliceous pigments and fumed (pyrogenic) silica wherein aggregates of precipitated silicas are usually preferred.

The precipitated silica employed in this invention are typically aggregates obtained by the acidification of a soluble silicate, e.g., sodium silicate and may include coprecipitated silica and a minor amount of aluminum.

Such silicas might usually be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 309 (1938), as well as ASTM D5604 for precipitated silica.

The silica may also be typically characterized by having a dibutylphthalate (DBP) absorption value in a range of about 50 to about 400 cc/100 g, and more usually about 100 to about 300 cc/100 g (ASTM D2414).

Various commercially available precipitated silicas may be considered for use in this invention such as, only for example herein, and without limitation, silicas from PPG Industries under the Hi-Sil trademark with designations Hi-Sil 210, Hi-Sil 243, etc; silicas from Rhodia as, for example, Zeosil 1165MP and Zeosil 165GR, silicas from Degussa AG with, for example, designations VN2 and VN3, as well as other grades of silica, particularly precipitated silicas, which can be used for elastomer reinforcement.

Various coupling agents, as previously described, may be used if desired to aid in coupling the silica (e.g. precipitated silica with hydroxyl groups on its surface), as well as interacting with the aforesaid functionalized carbon nanotubes.

It is readily understood by those having skill in the art that the rubber composition would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing fillers materials such as, for example, the aforementioned rubber reinforcing carbon black and precipitated silica. As known to those skilled in the art, depending on the intended use of the sulfur vulcanizable and sulfur vulcanized material (rubbers), the additives mentioned above are selected and commonly used in conventional amounts.

Typical amounts of tackifier resins, if used, may, for example, comprise about 0.5 to about 10 phr, usually about 1 to about 5 phr. Typical amounts of processing aids, if used, may comprise, for example from about 1 to about 50 phr. Such processing aids can include, for example and where appropriate, aromatic, napthenic, and/or paraffinic processing oils. Typical amounts of antioxidants where used may comprise, for example, about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants, where used, may comprise for example about 1 to 5 phr. Typical amounts of fatty acids, if used, which can include stearic acid and combinations of stearic acid with one or more of palmitic acid oleic acid and may comprise, for example, from about 0.5 to about 3 phr. Typical amounts of zinc oxide may comprise, for example, from about 1 to about 10 phr. Typical amounts of waxes, such as for example microcrystalline waxes, where used, may comprise, for example, from about 1 to about 5 phr. Typical amounts of peptizers, if used, may comprise, for example, from about 0.1 to about 1 phr.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents may be used, for example, in an amount ranging from about 0.5 to about 4 phr, or even, in some circumstances, up to about 8 phr.

Sulfur vulcanization accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging, for example, from about 0.5 to about 4, alternately about 0.8 to about 1.5 phr. In another embodiment, combinations of a primary and a secondary accelerator might be used with the secondary accelerator, where used, being usually used in smaller amounts (for example about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used, for example, which are not affected by normal processing temperatures but produce a satisfactory cure at ordinary vulcanization temperatures. Vulcanization retarders might also be used, where desired or appropriate. Suitable types of accelerators that may be used in the present invention may be, for example, amines, disulfides, guanidines, thioureas, thiazoles, thiurams, sulfenamides, dithiocarbamates and xanthates. Preferably, the primary accelerator is a sulfenamide. If a second accelerator is used, the secondary accelerator may be, for example, a guanidine, dithiocarbamate or thiuram compound.

The presence and relative amounts of the above additives are not considered to be an aspect of the present invention, unless otherwise indicated herein.

The mixing of the rubber composition can be accomplished by methods known to those having skill in the rubber mixing art. For example, as indicated, the ingredients are typically mixed in at least two stages, namely, at least one non-productive stage followed by a productive mix stage. The final curatives (e.g. sulfur and sulfur vulcanization accelerators) are typically mixed in the final stage which is conventionally called the "productive" mix stage in which the mixing typically occurs at a temperature, or ultimate temperature, lower than the mix temperature(s) than the preceding non-productive mix stage(s). The rubber, and reinforcing fillers, including the exfoliated graphene platelets and alternative additional reinforcing fillers such as, for example precipitated silica and rubber reinforcing carbon black mixed in one or more non-productive mix stages. The terms "non-productive" and "productive" mix stages are well known to those having skill in the rubber mixing art.

While various embodiments are disclosed herein for practicing the invention, it will be apparent to those skilled in this art that various changes and modifications may be made therein without departing from the spirit or scope of the invention.

What is claimed is:

1. A method of preparing rubber composition containing reinforcing filler comprised of, based upon parts by weight per 100 parts by weight rubber (phr):
   (A) Blending in at least one sequential preparatory mixing step at a temperature in a range of from about 70° C. to about 170° C.,
   (1) 100 phr of at least one diene-based elastomer,
   (2) about 30 to about 120 phr of rubber reinforcing filler comprised of about 0.5 to about 30 phr of graphene together with a specialized coupling agent, and
   (a) rubber reinforcing carbon black, or
   (b) combination of rubber reinforcing carbon black and precipitated silica, together with silica coupler for the precipitated silica having a moiety reactive with hydroxyl groups on the precipitated silica and another, different, moiety interactive with said diene-based elastomer(s),
   wherein said specialized coupling agent has a moiety with pi electrons to create a pi-pi network with the graphene and another polysulfide or thiol moiety to interact with said diene-based elastomer(s),
   wherein said specialized coupling agent is represented by Formula III as at least one of 1,3-di-(2-pyrenyl) alkyl polysulphide as Formula III(a) and thiolalkyl pyrene as Formula III(b) where n is a value of from 1 through 3 and x is a value of from 2 through 4:

Formula III

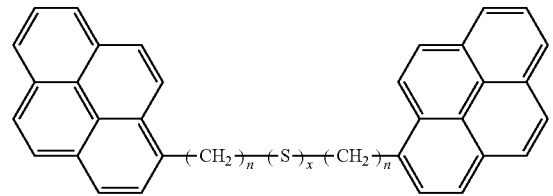

(a)

-continued (b)

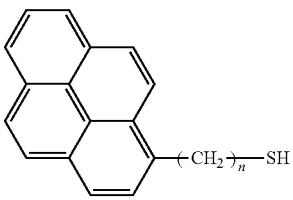

wherein said thiol moiety of said specialized coupler is chemically blocked from appreciably interacting with said diene-based elastomer(s) with a compound containing least one of dithiobenzoate, trithiocarbonate and thioester, (B) Blending in a subsequent final mixing step at a temperature in a range of from about 60° C. to about 120° C. sulfur curatives comprised of sulfur and at least one sulfur cure accelerator.

2. The method of claim 1 wherein said chemically blocked specialized coupling agent is comprised of at least one of 1-pyrenemethyl trithiocarbonate, 1-phenanthrene methyl trithiocarbonate, anthracene-9-methyl trithiocarbonate, 1,3-di-(2-pyrenyl) propyl polysulphide and thiolpropyl pyrene.

3. The method of claim 1 wherein said silica coupler is comprised of at least one of:
   (A) bis(3-triethoxysilylpropyl) polysulfide having an average of from about 2 to about 4 connecting sulfur atoms in its polysulfidic bridge, and
   (B) alkoxyorganomercaptosilane.

4. The method of claim 1 which further comprises, in at least one of said preparatory mixing step(s) containing said chemically blocked specialized coupler, blending a primary amine with said rubber composition.

5. The method of claim 4 wherein said primary amine is comprised of at least one of dodecylamine, aminopropyl triethoxysilane, and polyethylenimine.

6. The method of claim 4 wherein said method further comprises, in at least one of said preparatory mixing step(s) containing said primary amine blended with said chemically blocked specialized coupler, blending an organic acid with said rubber composition.

7. The method of claim 6 wherein said organic acid is comprised of at least one of salicylic acid, benzoic acid, toluic acid, m-hydroxybenzoic acid, and p-hydroxybenzoic acid.

8. A tire having at least one component comprised of the rubber composition prepared according to the method of claim 6.

9. A tire having at least one component comprised of the rubber composition prepared by the method of claim 4.

10. A rubber composition prepared by the method of claim 1.

11. The rubber composition of claim 10 wherein said silica coupler is comprised of at least one of:
   (A) bis(3-triethoxysilylpropyl) polysulfide having an average of from about 2 to about 4 connecting sulfur atoms in its polysulfidic bridge, and
   (B) alkoxyorganomercaptosilane.

12. The rubber composition of claim 10 wherein the reinforcing filler is comprised of graphene and as least one of rubber reinforcing carbon black and precipitated silica wherein the graphene is comprised of exfoliated graphene platelets.

13. A rubber composition of prepared by the method of claim 1 wherein said chemically blocked specialized coupling agent is comprised a compound selected from at least one of Formula I(a), Formula I(b) and Formula I(c):

Formula I

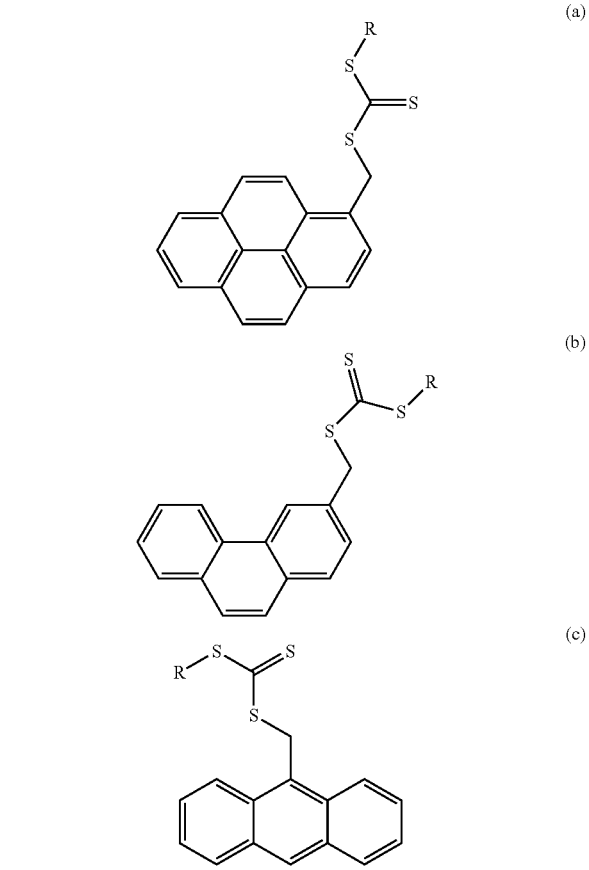

wherein R is selected from alkyl groups containing from 3 to 12 carbon atoms, a benzyl group and benzyl groups substituted with at least one of methyl, ethyl and propyl groups.

14. The method of claim 1 wherein said specialized coupling agent is comprised of at least one of 1,3-di-(2-pyrenyl) propyl polysulphide and chemically blocked thiolpropyl pyrene with the polysulphide or thiol groups available to co-cure with diene-based elastomer(s) in the rubber composition to form a carbon-sulfur bond with the elastomer(s) during the curing of the rubber composition at an elevated temperature.

* * * * *